Dec. 21, 1926.  
E. H. SHAFF  
HOSE COUPLING  
Filed Jan. 26, 1925  
1,611,286
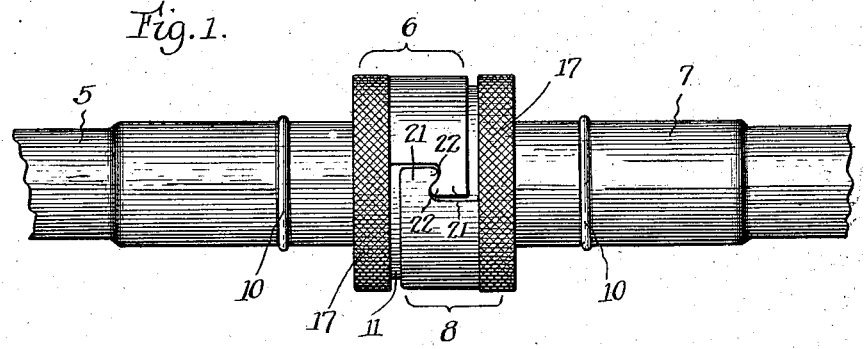
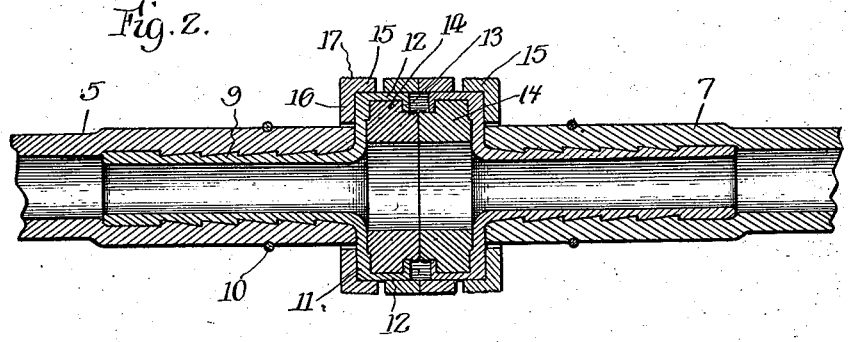
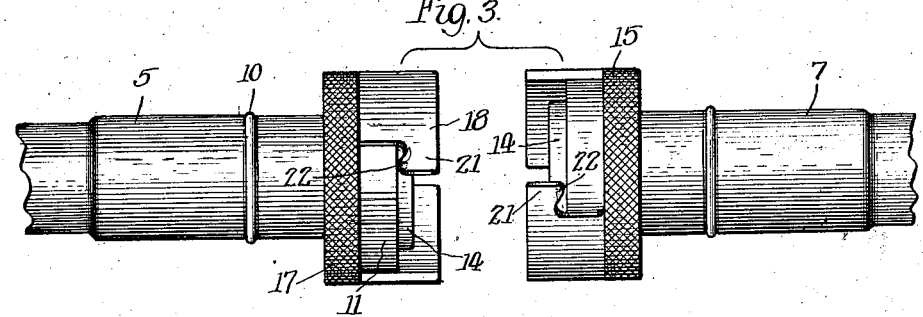
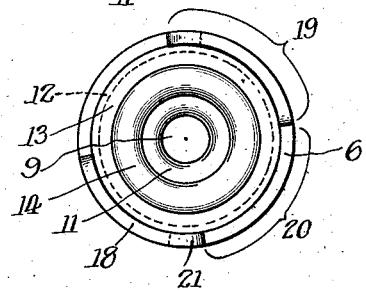
Inventor:  
Ernest H. Shaff,  
By Churchill Parker Carlson  
Attys Patented Dec. 21, 1926.

1,611,286

UNITED STATES PATENT OFFICE.

ERNEST H. SHAFF, OF GRAND HAVEN, MICHIGAN, ASSIGNOR TO WILLIAM H. KELLER, INC., OF GRAND HAVEN, MICHIGAN, A CORPORATION OF MICHIGAN.

HOSE COUPLING.

Application filed January 26, 1925. Serial No. 4,687.

This invention relates to couplings and particularly to couplings for hose and the like.

An object of this invention is to provide a hose-coupling which is adapted to be manufactured entirely from pressed metal, thereby providing a coupling which may be easily, economically and efficiently manufactured and assembled.

Another object of the invention is to provide a coupling having no outwardly projecting parts thereon so that the coupling in being dragged about with the hose will not be likely to catch upon other objects.

A further object of the invention is to provide a coupling which locks securely and yet is quickly detachable by hand, and which is of such a character that it may be simply and cheaply constructed.

In the accompanying drawings, which show an exemplary embodiment of the invention for the purpose of illustration and explanation, Figure 1 shows the device in a coupled relation.

Fig. 2 is a longitudinal central section of the device shown in Fig. 1.

Fig. 3 is a view of the device of Fig. 1 in separated or uncoupled relation.

Fig. 4 is a view in elevation looking toward the right hand part of Fig. 3.

In the drawings, Figure 1 represents a section of an air line in which a coupling is placed. Of course, it will be understood that other couplings may be placed in the line which may be composed of many lengths of hose. It is a characteristic of the coupling disclosed that each part thereof is identical thus permitting each length of hose to have duplicating fixtures at each end. In Fig. 1 the hose length 5 carries one part 6 and the hose length 7 carries a similar part 8. The parts 6 and 8 are duplicate parts and mutually interlocking to constitute the coupling. Each part carries the well known circular barb or corrugated tubular projection 9 to which the hose lengths 5 and 7 are secured by suitable clamps as the wires 10. The tube 9 has an enlarged head 11 of cylindrical form with the cylindrical wall 12 provided with an internal flange 13. A suitable gasket is provided for each part to abut a similar gasket on the other part to effect closure of the coupling. Because a certain resiliency of contact is required for the form of coupling disclosed, I use a compressible rubber gasket or washer 14 in each part. While the flange 13 is not necessary, it is provided by the undercutting of an internal annular groove or channel. The channel serves as a retainer for the rubber gasket which is suitably formed to lie in said channel from which it may be readily removed and replaced when desired.

To hold the two gaskets in contact, interlocking clamping means are provided over the enlarged heads 11, each part having a similar duplicating structure. This is provided as a collar indicated in each part as 15. Each collar is provided with an internal flange or an annular base portion 16 shown in Fig. 2 underlying the enlarged head 11. The collar 15 is cylindrical and shell-like in form. Adjacent the base 16 it is continuous circumferentially in the region indicated at 17 as knurled. The cylindrical portion beyond the knurling extends past the end of the walls 12 of head 11 so that the gasket 14 is within the end of the collar. The cylindrical portion of the collar 15 is cut away in part forming alternate lugs and recesses of equal arcuate length at the outer end 18, each length being indicated in Fig. 4 by the numeral 19 for a lug and the numeral 20 for a recess. In the present instance but two lugs and two recesses are formed in each member, each then being about 90° in arcuate extent. The recess is preferably slightly larger than the lug so that the parts may interfit loosely and mesh easily when coupled together. The depth of the recessed portion 20 is sufficient to bring the face of the compressed gasket 14 carried by head 11 about midway of its depth.

By this construction the parts may be fitted together bringing the end faces of the gaskets 14 into contact to seal the passage through the coupling. Lateral interlocking means is provided for the coupling by undercutting each lug 19 from the bottom of the adjacent recess 20, thus leaving overlying projections 21 as part of the lug. This undercutting is done in the same direction about the periphery of the coupling in order to permit mutual interlocking of the projections 21 by a twisting motion of the parts. The projections 21 themselves are again somewhat undercut in a direction along the axis of the coupling by giving the under side of the projection a shape corresponding to a reversed letter S, thereby providing other projections or hooks 22 which engage axially of the coupling.

In use, the coupling parts are first placed together as would follow from their position in Fig. 3 in which they are arranged for axial motion toward each other, each lug moving into a recess on the opposite part. As the insertion approaches completion the rubber gaskets meet and are compressed, opposing the insertion. When the insertion is completed the parts are twisted to move the projections 21 on the two parts into an overlapping relationship whereby to hold the parts against separation. By providing the reverse S-shaped side on the projection 21, the small hooks or projections 22 thus formed permit slight motion axially toward separation of the members. The separation is forced by the resiliency of the compressed rubber gasket. However, the motion permitted is just slight enough to lock the parts against laterally moving out of locked engagement by a twisting action. A further advantage of the construction described is the telescoping of the lugs 19 of one member over the head 11 of the other member. In the coupled relation of the two parts this close fitting telescoping relation gives rigidity to the coupling and operates against flexure at the joint.

In use a hose so coupled becomes provided with a truly cylindrical coupling without projections thereon. When the hose is dragged the dragging force is in the direction to hold the device in locked position thus preventing uncoupling thereof. Furthermore, the provision of duplicate parts on a single length of hose contributes largely to the desirability of this type of coupling and may in many cases prevent reversing a length of hose to effect the coupling.

A further advantage of the present invention arises because of the fact that the two sections of the coupling are identical and duplicating. In this instance the advantage accrues to the manufacturer because the making involves but one complete part and the production of this part is thereby doubled. In the storing, the shipping and assembling of couplings constructed according to this invention, no regard need be taken to assemble complementary parts because any two pieces will be complementary to each other.

While the device herein illustrated and described is a valuable and useful embodiment of the invention, it is to be understood that it in no way limits the invention short of the scope of the claim appended hereto.

I claim as my invention:

A hose coupling having two similar parts adapted for interlocking engagement, each part having in combination, a pressed metal collar including a centrally apertured base and a peripheral side wall, a pressed metal head fitted snugly inside said collar having a tubular member rigid therewith and projecting rearwardly through the aperture in the base of said collar, an inturned peripheral flange on said head, a resilient gasket removably held in said head by said flange and having a portion extending thereabove, and lugs formed from the peripheral side wall of each collar, said lugs on each of said parts being adapted to interengage to lock the two parts together.

In testimony whereof, I have hereunto affixed my signature.

ERNEST H. SHAFF.